Feb. 24, 1942.       D. C. PICKETT       2,273,986
PISTON
Filed March 25, 1940
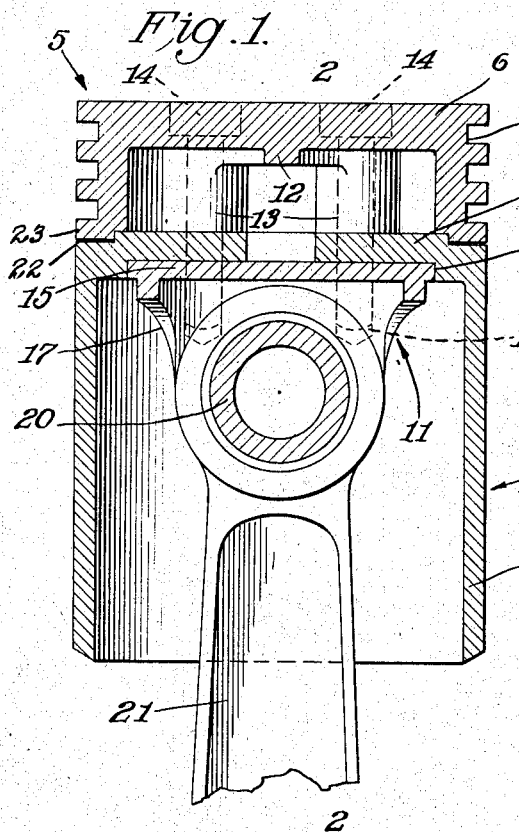
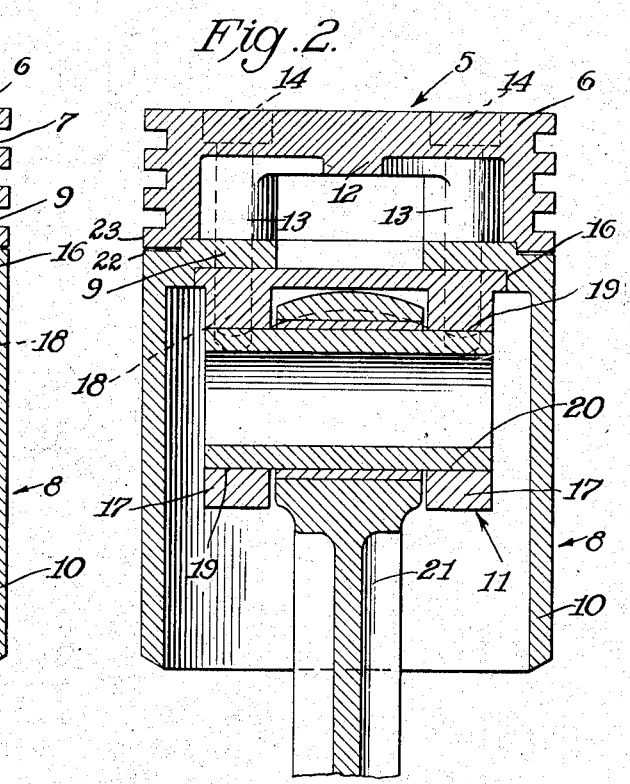
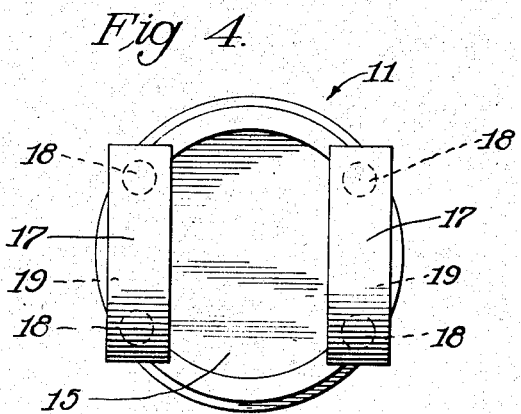
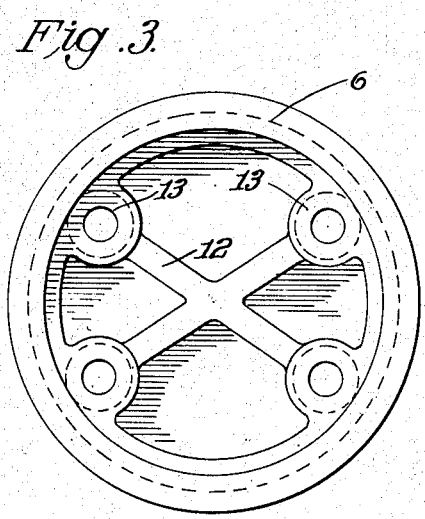
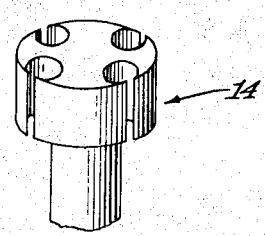
David C. Pickett
INVENTOR Patented Feb. 24, 1942

2,273,986

UNITED STATES PATENT OFFICE 2,273,986

PISTON

David C. Pickett, Canton, Ill., assignor of one-half to C. C. Saunders, Canton, Ohio Application March 25, 1940, Serial No. 325,894

2 Claims. (Cl. 309—14)

My invention relates to new and useful improvements in pistons and has as one of the principal objects thereof the provision of a piston so constructed and arranged whereby the same may be expeditiously detached from its connecting rod and withdrawn through the upper end of its cylinder, thus eliminating the necessity of removing the crank case of an engine and uncoupling the connecting rod from the crank shaft in order to remove the piston.

Another object of my invention is to provide a piston of the above described character which is simple in construction, durable in use, efficient in operation and economical in manufacture.

Other objects and advantages will be apparent from the following description, appended claims and annexed drawing.

Referring to the drawing wherein like reference characters designate like parts throughout the several views:

Figure 1 is a vertical sectional view of a piston constructed in accordance with my invention.

Figure 2 is a sectional view taken on the line 2—2 of Figure 1.

Figure 3 is a bottom plan view of the head section.

Figure 4 is a bottom plan view of the wrist-pin receiving section.

Figure 5 is a perspective view of a portion of one of the bolts utilized for connecting the various sections of the piston together.

In practicing my invention, as illustrated in the drawing, I provide a piston 5 having a ternary of sections, namely, a head section 6 in which are formed the piston ring lands for accommodating the usual piston rings (not shown); a skirt section 8 having an upstanding flange 9 and a skirt 10; and a wrist-pin receiving section or unit 11. The flange 9 of the skirt section 8 is disposed between the upper surface of the wrist-pin receiving section 11 and the lower surface of the head section 6 and has an annular recess 22 in the top peripheral portion thereof.

The under face of the head section 6 is fashioned with a cul-de-sac having an inner end wall provided with diagonally crossed reenforcing ribs 12, the outer ends of said ribs being integrally connected to spaced bosses 13 disposed in said cul-de-sac and through which extend bolts 14. The headed ends of the bolts are disposed in countersinks formed in the upper face of the head section 6 and have their lower end sections extending through openings formed in the flange 9 of the skirt section 8, said lower end sections of said bolts being threadedly secured within the section 11 as hereinafter set forth. The inner end of the section 6 is formed with a reduced annular portion 23 fitting into the recess 22 in the top of the flange 9.

The section 11 comprises a plate or disk 15 disposed within a similar shaped recess 16 formed in the lower face of the flange 9 whereby to seal the cul-de-sac against the admittance of oil in the head section during operation of the piston whereby to antevert the formation of carbon inside of said head section and to provide an air chamber within the head section which tends to maintain the oil for lubricating the adjacent parts of the piston at a low temperature. The lower face of the plate 15, adjacent the periphery thereof, is formed with a pair of oppositely disposed bearing blocks 17 each formed with vertically disposed threaded sockets 18 receiving the threaded ends of the bolts 14 whereby to secure the sections together in clamped relation and provide a unitary piston structure. The bearing blocks 17 are provided with aligned openings 19 through which extends a wrist-pin 20 pivotally connecting the upper end of a piston rod 21 between the bearing blocks 17 as clearly illustrated in Figure 2 of the drawing.

The piston rod 21 employed is of an ordinary construction of a type used in connection with engines for connecting the piston to the crank shaft and per se forms no part of the present invention. While I have described the lower end sections of the bolts as being threadedly secured within the section 11, it is to be understood that the entire shanks of the bolts may be threaded for threaded engagement within the bosses 13 if desired.

The heads of the bolts 14 are formed with a plurality of lengthwise extending circular-shaped grooves for receiving the pronged ends of a tool for securing said bolts through the sections 6 and 8 and threaded into the section 11 whereby to clamp the flange 9 between the sections 6 and 11. The ends of the wrist-pin 20 are disposed in spaced relation with respect to the inner face of the skirt 10 to preclude contact therewith.

From the foregoing it will be apparent that I have provided a piston so constructed and arranged whereby the head and skirt sections may be readily removed through the top of the cylinder for any desired purpose, thus eliminating removal of the lower section of the crank case and uncoupling of the connecting rod from the crank shaft.

Without further elaboration, the foregoing will so fully explain the invention that others may, by applying current knowledge, readily adapt the same for use under various conditions of service. Moreover, it is not indispensable that all the features of the invention be used conjointly since they may be employed advantageously in various combinations and sub-combinations.

It is obvious that the invention is not confined to the herein described use therefor as it may be utilized for any purpose to which it is adaptable. It is therefore to be understood that the invention is not limited to the specific construction as illustrated and described, as the same is only illustrative of the principles of operation, which are capable of extended application in various forms, and that the invention comprehends all construction within the scope of the appended claims.

What I claim is:

1. In a piston, a skirt section having a wall forming flange at the top end of a cylindrical skirt, the said end wall having a groove in the top margin and a central recess in the bottom face, the said end wall structure having bolt holes therethrough, a hollowed head section closed at the top end and having the lower edge of a peripheral wall thereof seated in the groove on the skirt section, a plurality of bolt receiving bosses extending axially through the cavity in the said head section, a wrist pin receiving section having a flat disk at the top thereof adapted to be fitted within the recess in the bottom face of the skirt section end wall, a pair of wrist pin bearings depending from the disk for engaging a wrist pin transversely within the skirt, the said wrist pin section having threaded sockets therein, and a plurality of bolts extending through the bosses in the head section, the holes in the skirt section end wall and engaging threaded sockets in the wrist pin section for detachably fastening the said sections in end to end assembly.

2. In a piston, a skirt section having a relatively long cylindrical skirt forming wall, an end wall formed at the outer end of the cylindrical wall provided with a central opening, the said end wall having an annular groove in the top face and a circular recess in the under face, a head section having a comparatively short cylindrical wall provided with circumferential ring lands, an end wall formed at the outer end of the cylindrical head wall, the inner end of the cylindrical head wall being seated in the groove in the outer face of the end wall of the skirt section, a wrist pin section having a flat disk seated in the recess in the inner face of the end wall of the skirt section and closing the aperture in the latter in assembly, a pair of complementary wrist pin receiving bearing blocks formed on the wrist pin disk, and a plurality of fastening elements extended axially through the said sections to tightly connect the same.

DAVID C. PICKETT.